(12) United States Patent
Lane et al.

(10) Patent No.: US 8,793,370 B1
(45) Date of Patent: Jul. 29, 2014

(54) COMMUNICATION ASSETS SURVEY AND MAPPING TOOL

(75) Inventors: Rita A. Lane, San Diego, CA (US); Eric Coolbaugh, San Diego, CA (US); Robert Drew, Asheville, NC (US); Alice Moore, San Diego, CA (US); Jeffrey B. Lee, Lakeside, CA (US); Walter M. Seay, Poway, CA (US); Alan O. Peterson, La Mesa, CA (US)

(73) Assignee: The United States of Amerca, as Represented by the Secretary of the Navy, Washington, DC (US)

( * ) Notice: Subject to any disclaimer, the term of this patent is extended or adjusted under 35 U.S.C. 154(b) by 130 days.

(21) Appl. No.: 13/019,381

(22) Filed: Feb. 2, 2011

Related U.S. Application Data

(63) Continuation-in-part of application No. 11/452,565, filed on Jun. 5, 2006, now abandoned, which is a continuation-in-part of application No. 11/449,178, filed on May 16, 2006.

(51) Int. Cl.
  *G06F 15/173* (2006.01)
  *H04B 1/59* (2006.01)
  *H04L 12/24* (2006.01)

(52) U.S. Cl.
  CPC .. *H04B 1/59* (2013.01); *H04L 41/08* (2013.01)
  USPC ...................................................... 709/224

(58) Field of Classification Search
  CPC ................................. H04B 1/59; H04L 41/08
  USPC ...................................................... 709/224
  See application file for complete search history.

(56) References Cited

U.S. PATENT DOCUMENTS

| | | | |
|---|---|---|---|
| 5,584,025 A | 12/1996 | Keithley et al. | |
| 6,216,130 B1 | 4/2001 | Hougaard et al. | |
| 6,744,877 B1 * | 6/2004 | Edwards | 379/265.02 |
| 6,842,906 B1 * | 1/2005 | Bowman-Amuah | 719/330 |
| 7,020,697 B1 * | 3/2006 | Goodman et al. | 709/223 |
| 7,508,840 B2 * | 3/2009 | Delaney | 370/466 |
| 7,656,271 B2 * | 2/2010 | Ehrman et al. | 340/5.8 |
| 8,045,998 B2 * | 10/2011 | Shaffer et al. | 455/456.2 |
| 8,260,338 B2 * | 9/2012 | Shaffer et al. | 455/518 |

(Continued)

OTHER PUBLICATIONS

Unpublished U.S. Appl. No. 12/365,540, by Robert J. Ryder et al., entitled "Communications Assets Survey and Mapping Tool", filed Feb. 4, 2009-02-04, All.

*Primary Examiner* — Kristie Shingles
(74) *Attorney, Agent, or Firm* — Arthur K. Samora; Kyle Eppele; SSC Pacific Patent Office

(57) ABSTRACT

A Communication Assets Survey and Mapping Tool can include a CAS data collection sub-module, a CASM database server, a CAM display sub-module, a CAM data sub-module and a MAP generator sub-module. The CAS data collection sub-module is capable of collecting communication asset data. The CASM database server is capable of receiving and storing communication asset data from said CAS data collection sub-module. The CAM display module is capable of transmitting data and interoperability communication gaps in a display format. The CAM data sub-module is capable of providing an interface between the CAM display sub-module and the CASM database server for the storage and retrieval of information regarding data sharing. The MAP generator sub-module is capable of generating a customized map image that can be displayed using the CAM display sub-module.

2 Claims, 8 Drawing Sheets

(56) References Cited

U.S. PATENT DOCUMENTS

| | | |
|---|---|---|
| 2004/0070515 A1 | 4/2004 | Burkley et al. |
| 2004/0120857 A1 | 6/2004 | Smith et al. |
| 2005/0034075 A1 | 2/2005 | Riegelman et al. |
| 2006/0080344 A1 | 4/2006 | McKibben et al. |
| 2008/0004904 A1 | 1/2008 | Tran |
| 2008/0037461 A1* | 2/2008 | Biltz et al. .................... 370/328 |
| 2008/0274761 A1 | 11/2008 | Block et al. |
| 2010/0114493 A1 | 5/2010 | Vestal |
| 2010/0149335 A1 | 6/2010 | Miller, II |
| 2010/0250312 A1 | 9/2010 | Tarabzouni et al. |
| 2010/0257452 A1 | 10/2010 | Peterson |

* cited by examiner

300

COMMUNICATION ASSETS SURVEY AND MAPPING TOOL

CROSS-REFERENCE TO RELATED APPLICATIONS

This application is a continuation-in-part of U.S. application Ser. No. 11/452,565, filed Jun. 5, 2006 now abandoned, entitled "Communication Assets Survey and Mapping Tool", which is further a continuation-in-part of U.S. application Ser. No. 11/449,178, filed May 16, 2006, entitled "Communication Assets Survey and Mapping Tool". The '565 and '178 applications are hereby incorporated by reference herein in their entirety.

FEDERALLY SPONSORED RESEARCH AND DEVELOPMENT

This invention (Navy Case No. 100905) is assigned to the United States Government and is available for licensing for commercial purposes. Licensing and technical inquiries may be directed to the Office of Research and Technical Applications, Space and Naval Warfare Systems Center, San Diego, Code 72120, San Diego, Calif., 92152; voice (619) 553-2778; email T2@spawar.navy.mil, Reference Navy Case Number 100905.

BACKGROUND

The Communication Assets Survey and Mapping Tool is generally in the field of public safety.

Emergency responders such as emergency medical services (EMS) personnel, fire-rescue personnel, and law enforcement officers need to share vital data or voice information across disciplines and jurisdictions to successfully respond to major incidents and large-scale emergencies. Many people assume that emergency response agencies across the nation are fully interoperable. In actuality, emergency responders often cannot talk to some parts of their own agencies, let alone communicate with agencies in neighboring cities, counties, or states.

A need exists for tools that help local state and federal entities assess their interoperability levels, and to assist emergency response agencies and policy makers in the planning and implementation of interoperability solutions for data and voice communications, in order to improve interoperability levels of local, state and federal emergency and first responder communication assets.

BRIEF DESCRIPTION OF THE DRAWINGS

The novel features of the present invention will be best understood from the accompanying drawings, taken in conjunction with the accompanying description, in which similarly-referenced characters refer to similarly referenced parts, and in which.

DETAILED DESCRIPTION

Figure 1A:
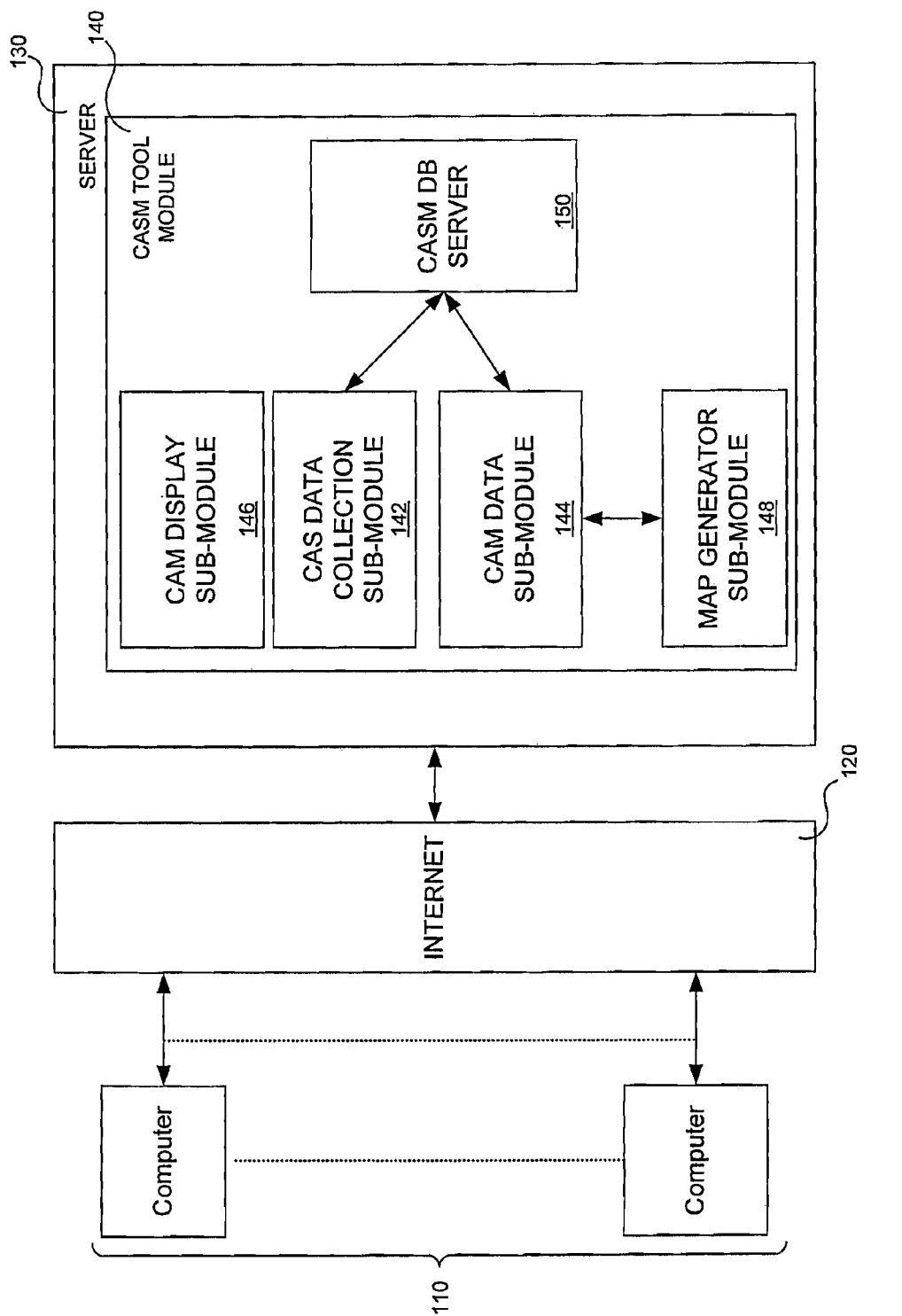
FIG. 1A is a block diagram of several embodiments of a communication assets survey and mapping tool.

Described herein is a Communication Assets Survey and Mapping Tool.

DEFINITIONS

The following acronyms are used herein:
CAM—Communication Assets Mapping
CAS—Communication Assets Survey
CASM—Communication Assets Survey and Mapping
DB—Database
DSM—Display Sub-Module
ISP—Internet Service Provider In brief overview, and as stated above in the Background, emergency responders such as emergency medical services (EMS) personnel, fire-rescue personnel, and law enforcement officers need to share vital data or voice information across disciplines and jurisdictions to successfully respond to major incidents and large-scale emergencies. Many people assume that emergency response agencies across the nation are fully interoperable. In actuality, emergency responders often cannot talk to some parts of their own agencies, let alone communicate with agencies in neighboring cities, counties, or states.

To help solve the interoperability problem, the Department of Homeland Security (DHS) published the Interoperability Continuum, with local and state input and as part of the DHS SAFECOM program. SAFECOM is a communications program of the Department of Homeland Security, and the SAFECOM program promulgates guidance on interoperability issues related to communications to local, tribal, state, and Federal emergency response agencies. The DHS Office of Emergency Communications (OEC) supports SAFECOM's development of grant guidance, policy, tools, and templates, and the OEC provides direct assistance to local, tribal, state, and Federal practitioners. OEC is an office within the DHS Directorate for National Protection and Programs.

As an evolving tool, the Interoperability Continuum supports the National Preparedness Strategy and aligns with national frameworks including, but not limited to, the National Response Framework, the National Incident Management System, the National Emergency Communications Plan, and the National Communications Baseline Assessment. To maximize the Interoperability Continuum's value to the emergency response community, SAFECOM regularly updates the Interoperability Continuum through a consensus process involving practitioners, technical experts, and representatives from local, tribal, state, and Federal agencies.

The Interoperability Continuum is designed to assist emergency response agencies and policy makers to plan and implement interoperability solutions. The Interoperability Continuum identifies five critical success elements that can be addressed to achieve a sophisticated interoperability solution: 1) Governance; 2) Standard operating procedures (SOPs); 3) Technology; 4) Training; and, 5) Exercises and regular usage of interoperable communications. Jurisdictions across the nation can use the interoperability Continuum to track progress in strengthening interoperability according to the Interoperability Continuum elements. The invention according to several embodiments focuses on the Technology element of the Interoperability Continuum.

The Technology element of the Interoperability Continuum can be divided into data communications technology and voice communications technology. Successful implementation of data and voice communications technology is highly dependent on effective collaboration and training among participating agencies and jurisdictions. Technologies should meet the needs of practitioners on the frontlines and should address regional needs, existing infrastructure, cost versus benefit, and sustainability. The technologies described within the Continuum must be scalable in order to effectively support day-to-day incidents as well as large-scale disasters. Many times, a combination of technologies is necessary to provide effective communications among emergency responders. Security and authentication challenges are present in each technology and must be considered in all implementation decisions.

The voice communications technology continuum can be subdivided into five levels of interoperability (listed in order from "least" interoperable to "most" interoperable); 1) Swapping Radios; 2) Gateways; 3) Shared Channels; 4) Proprietary Shared Systems; and, 5) Standards-Based Shared Systems. Swapping radios, or maintaining a cache of standby radios, is an age-old solution that is time-consuming, management-intensive, and likely to provide limited results due to channel availability. Gateways can retransmit across multiple frequency bands to provide an interim interoperability solution as agencies move toward shared systems. However, gateways are inefficient in that they require twice as much spectrum because each participating agency must use at least one channel in each band per common talk path and because they are tailored for communications within the geographic coverage area common to all participating systems. One example of such a gateway system is the ACU-1000 system.

With respect to Shared Channels, interoperability is promoted when agencies share a common frequency band or air interface (analog or digital), and when the agencies are able to agree on common channels. However, the general frequency congestion that exists nationwide can place severe restrictions on the number of independent interoperability talk paths available in some bands. As the name implies, Proprietary shared systems offer a high level of interoperability, but limit the user's choice of product with regard to manufacturer and competitive procurement because of manufacturer's assertion of proprietary rights in the system hardware and associated technical data/computer software. Standards-based shared systems offer the highest level of interoperability, and also promote competitive procurement and a wide selection of products to meet specific user needs. One such example of a Standards-based system is the P25 communications system. P25 systems offer the highest level of interoperability, but they are also the most expensive.

For the present invention according to several embodiments, CASM can be designed to detect communications gaps between federal, state and local first responders for any given geographic area. A communications "gap" occurs when two or more public safety first responder agencies cannot communicate with one another at the same technology level within the SAFECOM continuum. For example, if police and fire agencies respond to an incident and are using two disparate radio types, they cannot communicate at even the lowest interoperability level unless the agencies "swap" radios so that each has a police and a fire radio. Or the agencies may establish communications via a gateway device. Swapping radios or connecting via a gateway can be two methods of interoperating to resolve a communications gap. As mentioned above, other fundamental methods can include using shared channels, proprietary systems or P25 digital standard radio systems. All five levels described above, i.e.: (1) Swapping radios (2) Gateways (3) Shared channels (4) Proprietary systems and (5) P25 digital standard systems make up the technology lane of the SAFECOM continuum. CASM can perform a communications gap analysis that reflects the SAFECOM standard and can provide a means to evaluate the communications interoperability status for a given geographic area, and to communicate that status to a decision-maker in an easy-to-understand format. In several embodiments, that format can be a color coded interoperability matrix to display the results for any given geographic area, such as a city, state or territory. Once the gap is identified, event planners can make business decisions as to whether or not to increase the interoperability level between agencies within the geographic area by improving communications, and whether it makes business sense to do so.

It should be appreciated that that CASM according to several embodiments can be considered a strategic system, as opposed to a tactical system. The CASM evaluates interoperability status prior to events for planning purposes, as described above. CASM lists communications capabilities of first responders for a geographic area, and can provide a communications gap analysis for those first responders. CASM is not a communications system, and CASM does not provide any ability to change communications capability status or of any communications equipment. Event planners have the capability to view the CASM outputs are described below, but the planners do not have the capability to modify the displayed operability data. That data can only be modified when/if a first responder upgrades its communications equipment (and provided the updated data to CASM). CASM can best be described as a managerial tool. On-scene first responders do not have the capability to access and update CASM during an actual event.

To accomplish the above, the Communication Assets Survey and Mapping (CASM) system can include a CASM Tool Module, which includes a communication assets mapping (CAM) display sub-module, a communication assets survey (CAS) data collection sub-module, a CAM data sub-module, a map generator sub-module and a CASM database (DB) server. As 9 described above, the CASM Tool provides a method and apparatus for viewing interoperability of emergency and first responder communication assets between local, state and federal entities. The CASM Tool can further provide a mechanism for collecting communication assets data, determining interoperability between agencies based on communication assets and providing interoperability data to users. The CASM Tool provides access to geographically disparate users via the Internet and display of communications equipment and information in a geo-spatial referenced map to users via the Internet.

Referring now to the Figures, FIG. 1A is a block diagram of several embodiments of a CASM tool. As shown in FIG. 1A, CASM tool system 100 includes at least one computer 110, internet 120 and system server 130, which hosts CASM tool module 140. CASM tool module 140 includes CAM display sub-module 146, CAS data collection sub-module 142, CAM data sub-module 144, map generator sub-module 148 and CASM DB server 150. As shown in FIG. 1A, at least one computer 110 is operatively coupled to internet 120 so data can be transmitted between at least one computer 110 and internet 120. Internet 120 is operatively coupled to system server 130 so data can be transmitted between internet 120 and system server 130. At least one computer 110 and system server 130 can be operatively coupled to internet 120 in one of many configurations such as connection via an internet service provider (ISP).

As shown in FIG. 1A, CASM tool module 140 includes CAS data collection sub-module 142, CAM data sub-module 144, map generator sub-module 148, CASM DB server 150 and CAM display sub-module 146. CASM tool module 140 can include a non-transitory computer readable medium containing computer instructions stored therein for causing a computer processor to analyze that data from CAS data collection sub-module 142 and CAM data sub-module 144, to determine communications gaps between said agencies. CASM tool module 140 can further be operatively coupled to system server 130.

CAS data collection sub-module 142 is operatively coupled to CASM DB server 150. CAS data collection sub-module 142 includes computer programs capable of collecting communication asset data and interfacing with CASM DB server 150 for: 1) Storing communication asset data; 2) Providing a mechanism for input, validation and viewing of state and urban area communications equipment data; and, 3) Providing forms, reports generation and retrieval/storage of data in CASM DB server 150.

CAM data sub-module 144 is operatively coupled to and provides an interface between CAM Display Sub-Module 146 and CASM DB Server 150. CAM data sub-module 144 includes computer programs which can cause a processor to provide an interface between CAM display sub-module 146 and CASM DB Server 150 for the storage/retrieval of information regarding data sharing. For example, CAM display sub-module 146 includes an interface for storage/retrieval of a Tactical Interoperable Communications Plan, maps that display interoperability gaps, and other user files, which allows data sharing between region managers and their users.

Map generator sub-module 148 is operatively coupled to CAM data sub-module 144. Map generator sub-module 148 is capable of generating a customized map image to be shown to a user via CAM display sub-module 146 and at least one computer 110. In several embodiments, map generator sub-module 148 receives input from a user regarding custom map specifications. Map generator sub-module 148 can also generate a customized map image to CAS data collection sub-module 142.

CASM DB server 150 is operatively coupled to CAM data sub-module 144 and CAS data collection sub-module 142 so that data can be transmitted between all three. CASM DB server 150 is capable of being a central repository for all CASM data. CASM DB server is capable of being used as a storage/retrieval DB for other CASM components (e.g., CAS data collection sub-module 142).

CAM display sub-module 146 includes computer programs capable of receiving requests for a display of communication data and interoperability of a geographic area, retrieving communication data and interoperability information and transmitting data and interoperability information in a display format. In several embodiments, CAM display sub-module 146 uses CAM data sub-module 144 to obtain system data for a displayed region. In several embodiments, CAM display sub-module 146 uses data to calculate interoperability data for a selected region and formats the data to be displayed on a map obtained from map generator sub-module 148. In several embodiments, CAM display sub-module 146 allows a user to select all of the applicable data for a region or to select a subset of the data based upon display requirements. However, CAM display sub-module 146 does not allow the planner (user) to modify the interoperability data.

Figure 1B:
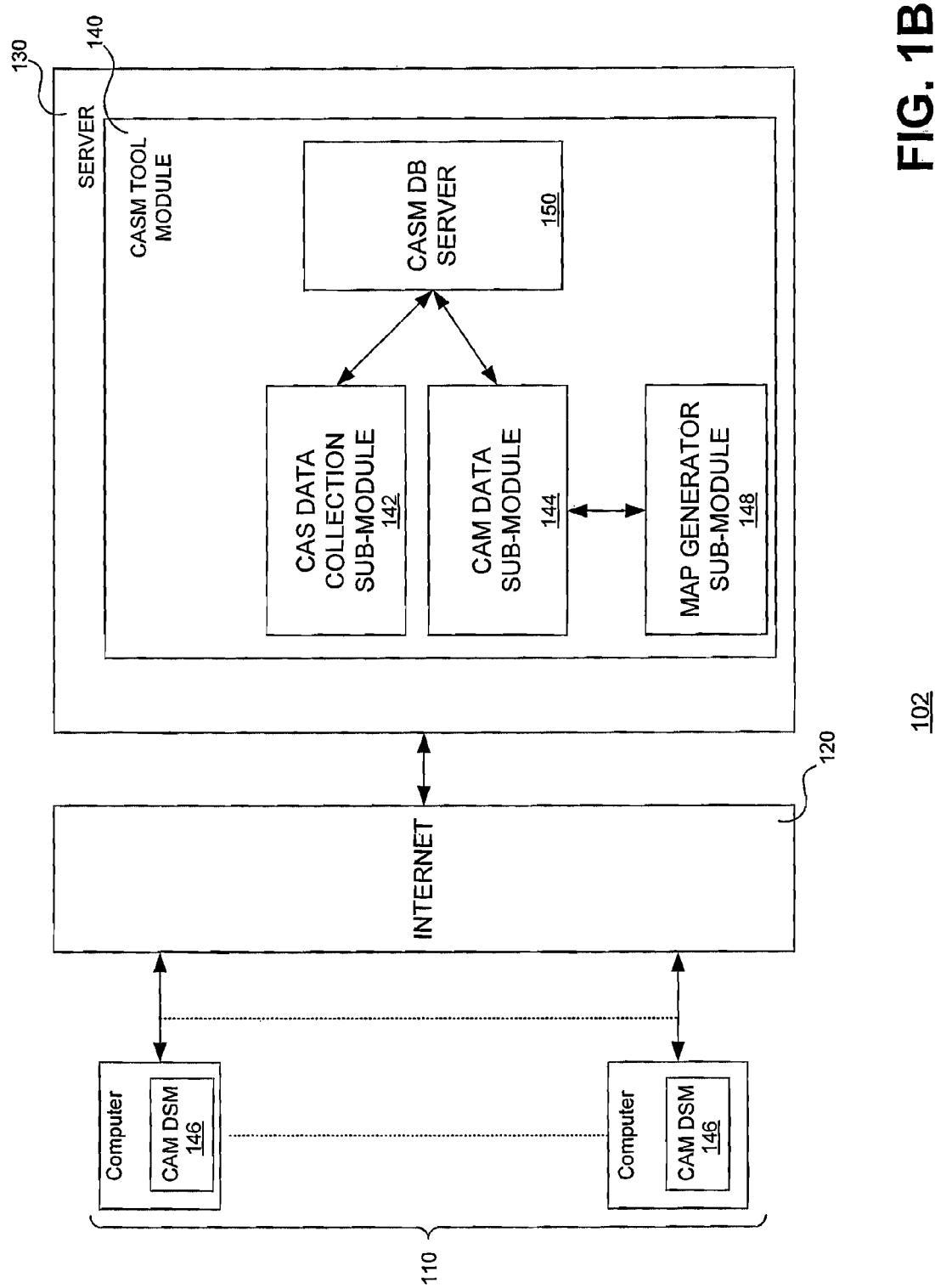
FIG. 1B is a block diagram of several embodiments of a communication assets survey and mapping tool.

FIG. 1B is a block diagram of several embodiments of a communication assets survey and mapping tool. FIG. 1B is substantially similar to FIG. 1A, and thus, similar components are not described again. As shown in FIG. 1B, CASM tool system 102 includes at least one computer 110, internet 120 and system server 130, which hosts CASM tool module 140. CASM tool module 140 includes CAS data collection sub-module 142, CAM data sub-module 144, map generator sub-module 148 and CASM DB server 150. At least one computer 110 is operatively coupled to internet 120 so data can be transmitted between at least one computer 110 and internet 120. CAM display sub-module 146 is operatively coupled and resides on at least one computer 110.

Figure 1C:
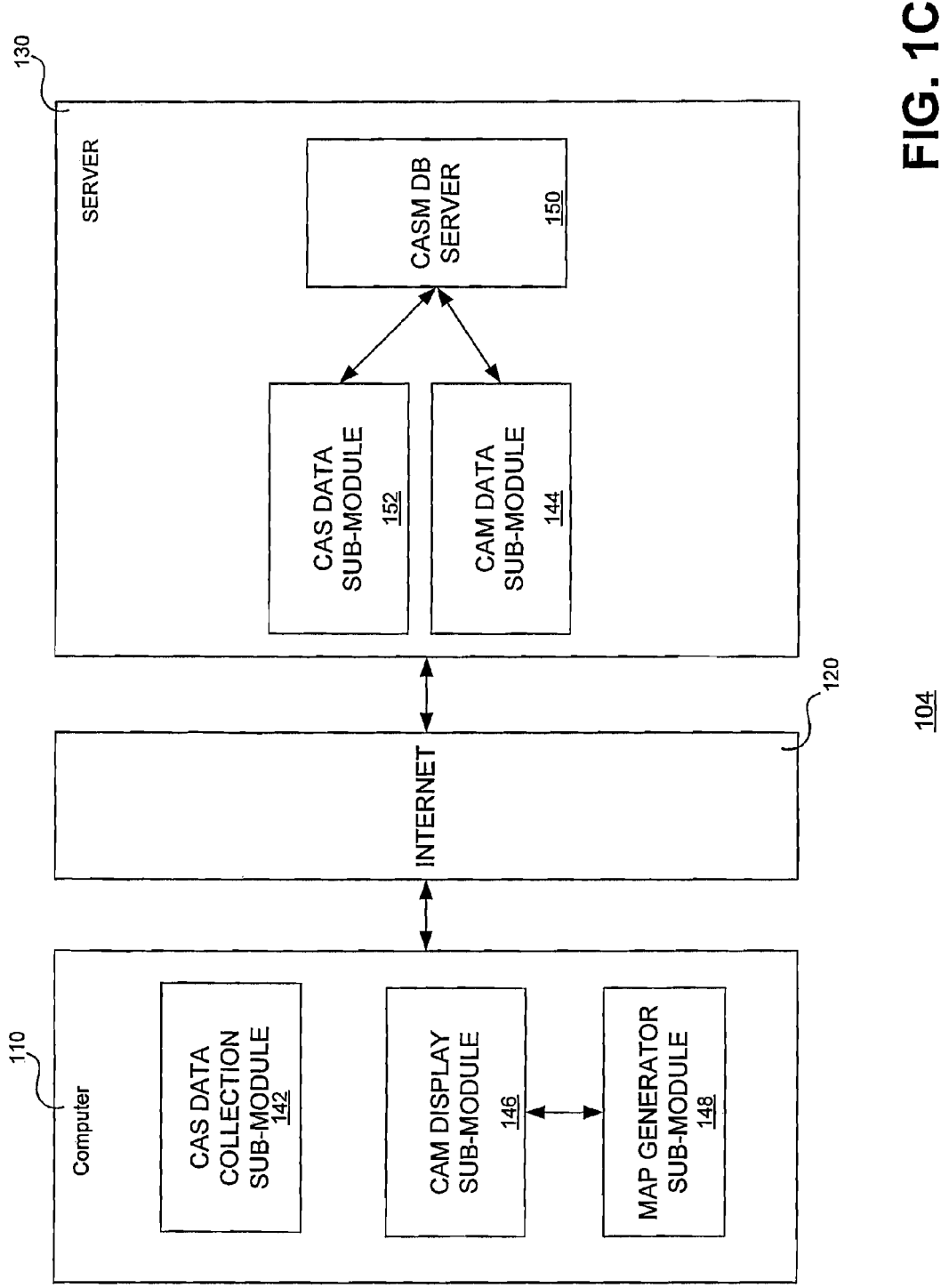
FIG. 1C is a block diagram of several embodiments of a communication assets survey and mapping tool.

FIG. 1C is a block diagram of several embodiments of a communication assets survey and mapping tool. FIG. 1C is substantially similar to FIG. 1A, and thus, similar components with previously reference characters are not described again. As shown in FIG. 1C, CASM tool system 104 includes at least one computer 110, internet 120, system server 130, CAS data collection sub-module 142, CAM data sub-module 144, CAM display sub-module 146, map generator sub-module 148, CASM DB server 150 and CAS data sub-module 152. System server 130 hosts CAM data sub-module 144, CASM DB server 150 and CAS data sub-module 152. CAS data sub-module 152 is capable of interfacing between CAS data collection sub-module 142 and CASM DB server 150. At least one computer 110 hosts CAS data collection sub-module 142, CAM display sub-module 146 and map generator sub-module 148.

Figure 2:
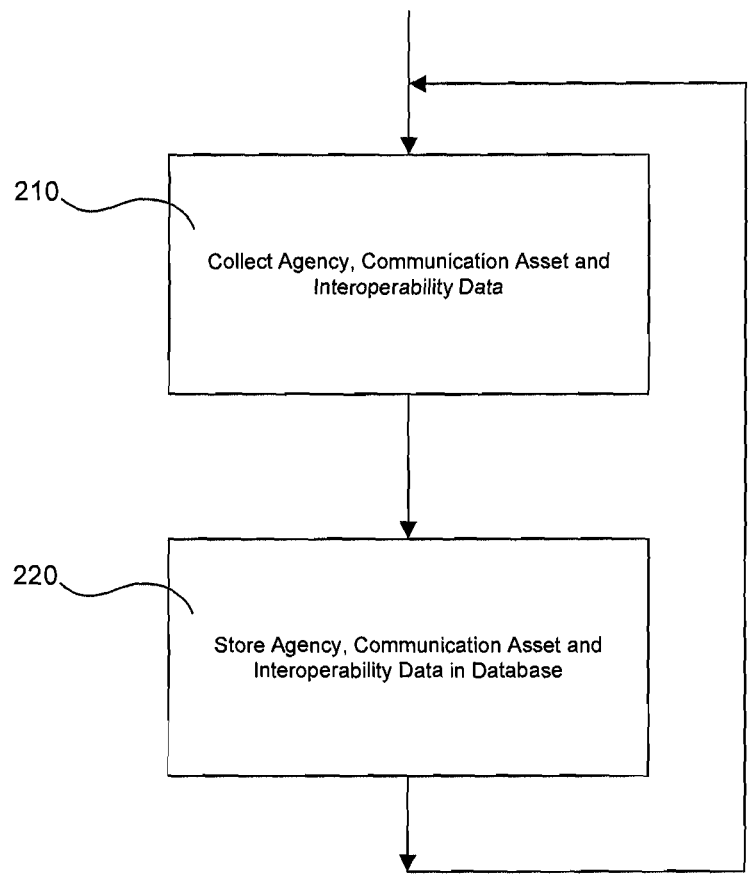
FIG. 2 is a flowchart of several embodiments of a method of a communication assets survey and mapping tool.

FIG. 2 is a flowchart of several embodiments of a method of a communication assets survey and mapping tool. Flowchart 200 of FIG. 2 can illustrate several embodiments of a method of CAS data collection sub-module 142 of FIG. 1A referred to as a CAS data collection sub-module method. Referring to FIG. 2, at BOX 210 of flowchart 200, the method collects agency, communication asset and interoperability data. In several embodiments, the method performs BOX 210 using a computer program having a non-transitory computer readable medium containing computer instructions stored therein for causing a computer processor to perform the steps of the methods of several embodiments that are shown in FIG. 2. After BOX 210, the method of flowchart 200 of FIG. 2 proceeds to BOX 220. As depicted by BOX 220 of flowchart 200, the methods according to several embodiments can include the step of storing agency, communication asset and interoperability data in a database. In several embodiments, the method performs BOX 220 using software, or another non-transitory computer readable medium containing computer instructions stored therein for causing a computer processor to perform the methods. After BOX 220, the method of flowchart 200 of FIG. 2 returns to BOX 210.

Figure 3:
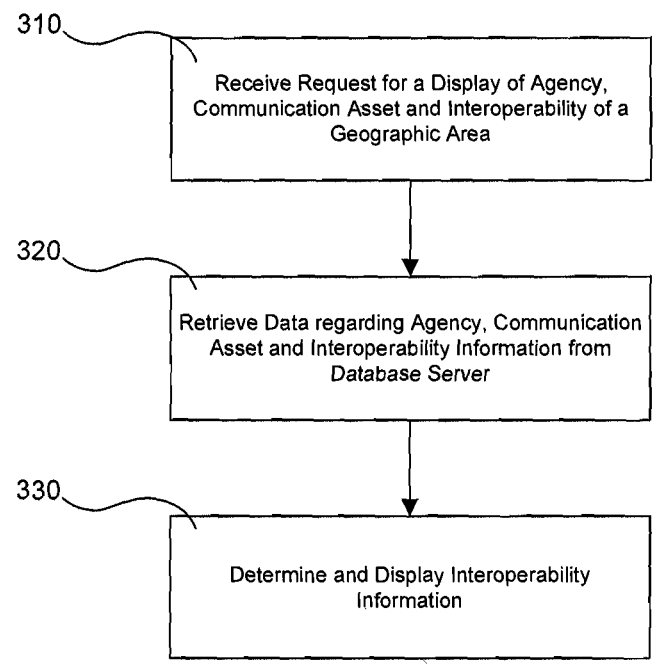
FIG. 3 is a flowchart of several embodiments of a method of a communication assets survey and mapping tool.

FIG. 3 is a flowchart of several embodiments of a method of a communication assets survey and mapping tool. Flowchart 300 of FIG. 3 can depict several embodiments of a method of CAM data sub-module 144 of FIG. 1A referred to as CAM display sub-module method. Referring to FIG. 3, at BOX 310 of flowchart 300, the method receives a request for a display of agency, communication asset and interoperability data for first responders in a geographic area of interest. In several embodiments, the method performs BOX 310 using software. After BOX 310, the method of flowchart 300 of FIG. 3 proceeds to BOX 320. At BOX 320 of flowchart 300, the method retrieves data regarding agency, communication asset and interoperability information from the database (e.g., CASM database server 150). In several embodiments, the method performs BOX 320 using software. After BOX 320, the method of flowchart 300 of FIG. 3 proceeds to BOX 330.

At BOX 330 of flowchart 300, the method determines and displays interoperability information, including communications gaps between agencies with the geographic area. In several embodiments, the method performs BOX 330 using software. In several embodiments, the method performs BOX 330 by determining interoperability communications gaps between agencies based on their communication assets data. The method of flowchart 300 of FIG. 3 terminates at BOX 330. The methods of several embodiments as illustrated in FIG. 3 do not allow for modification of the data by the planner (user). These methods are used for strategic planning purposes prior to an event.

Figure 4:
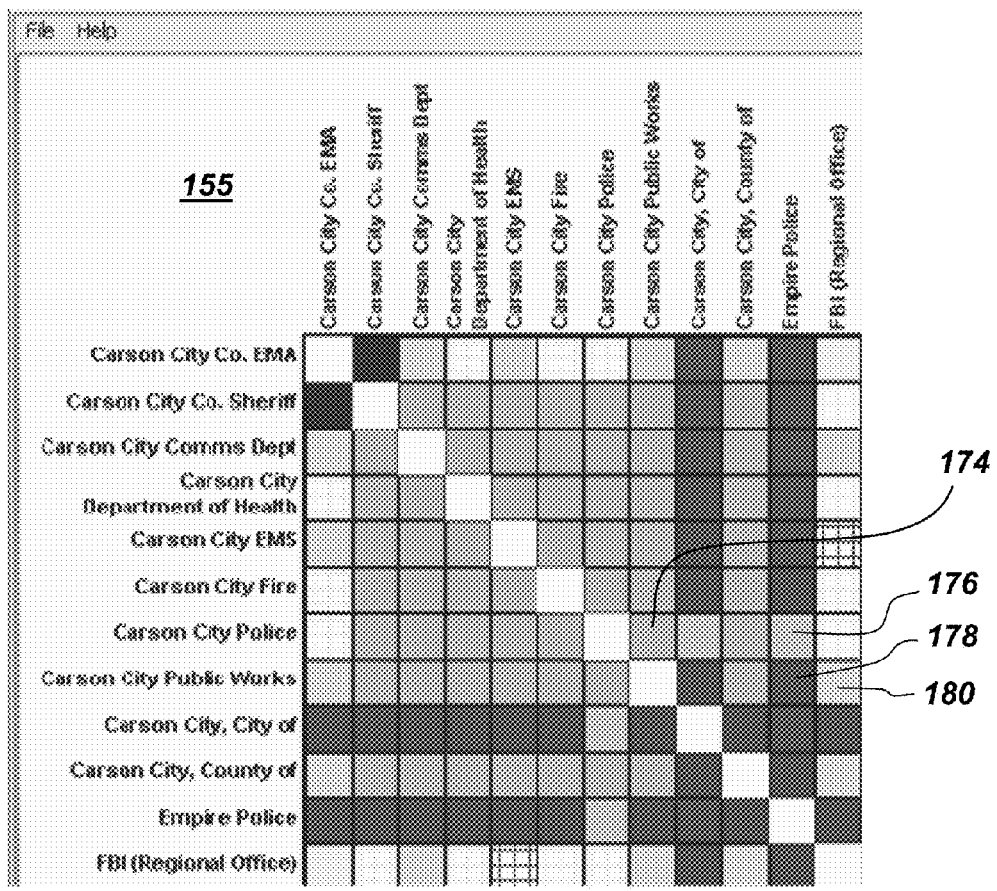
FIG. 4 is a partial screen shot of a planner interface in a matrix format, which results from accomplishing the methods of several embodiments as illustrated in FIG. 3.
Figure 5:
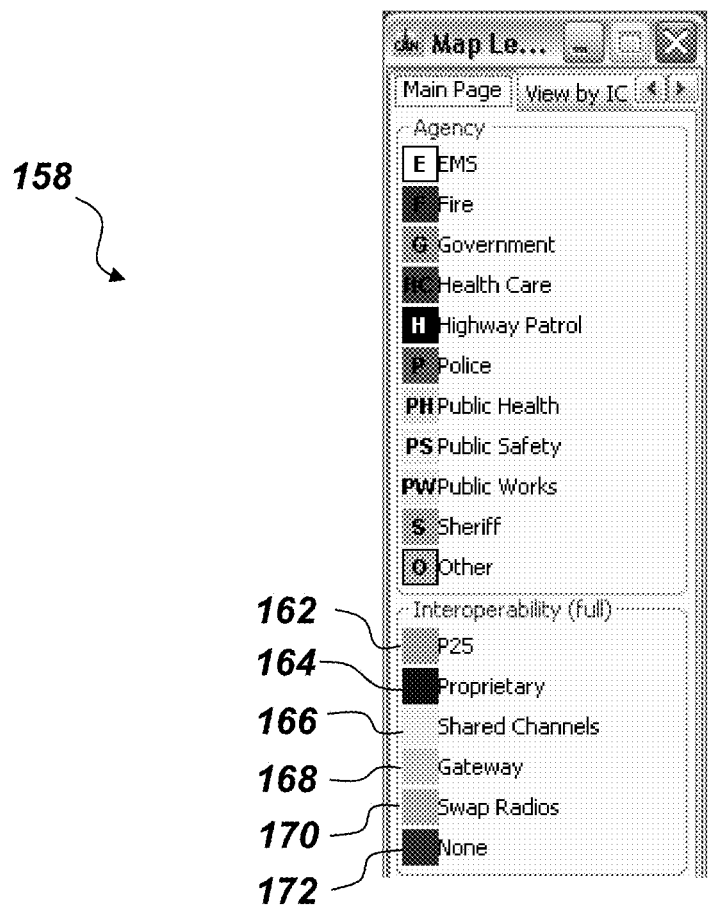
FIG. 5 is a legend which can be used to interpret the matrix entries of FIG. 4; and, FIG. 6 is a partial screen shot of a planner interface in a map format, which results from accomplishing the methods of several embodiments as illustrated in FIG. 3.

Referring now to FIGS. 4 and 5, the manner in which the aforementioned communications gaps can be displayed in several embodiments can be shown. In FIG. 4, a partial screen shot 155 resulting from the operation of CASM tool according to several embodiments is shown. In partial screen shot 155, the communications gap for several first responders in the Carson City, Nev. area is shown in matrix form. FIG. 5 is a legend 158 of the different symbolism used in FIG. 4. In FIG. 5, patterns 162, 164, 166, 168 and 170 correspond to interoperability levels swapping radios, gateways, shared channels, proprietary systems and standards based systems, respectively. Pattern 172 is used to indicate that there is no interoperability between the first responders. It should also be appreciated that in addition to imposing different patterns in blocks 162-172 to indicate different levels of interoperability according to the SAFECOM definitions, the blocks could be made in various colors for ease of reference.

By cross-referencing the Carson City Police and the Carson City Fire Department (box 174), it can be seen that the Carson City Police and Carson City Fire Department enjoy a P25 standard based communications level or interoperability; these two organizations do not have a communications gap. Similarly, by referring to box 176 in FIG. 4, it can be seen that the Empire Police Department and the Carson City Police have a swapping radios level of interoperability. However, as can be seen by box 178 in FIG. 4, the Empire Police and Carson City Public Works do not have any level of compatibility. A strategic event planner (such as a county commission that has jurisdiction over both Carson City and Empire, for example), could use the data illustrated by the planner interface shown in FIG. 4, to make the business decision to buy an extra radio for the Carson City Public Work and Empire police, so that the two organization could at least enjoy a rudimentary level of interoperability. Or, the planner could decide that it is unlikely that these two organizations will ever need to communicate directly, and decide not to provide the extra communications capability to either organization.

Alternatively, and as shown by box 180 in FIG. 4, the strategic event planner can review the interoperability matrix and realize that the FBI Regional Office enjoys a gateway level of communications interoperability (according to the SAFECOM scale) with the Carson City Public Works. In lieu of expending scarce funding to purchase radios for the Carson City Public Works and the Empire Police, which may not be used, the planner could instead decide to establish an agreement such a Memorandum of Understanding between the Carson City Public Works and the FBI Regional Office to allow use of the FBI Regional Office gateway to communicate with the Empire police if an event occurs. In either of these cases, the government event planner is able to make decisions on whether (or not) to fill in communications gaps between first responder agencies within a geographic area, but only before the event occurs. As stated above, the CASM is not a communication system, and it does not establish communications between first responders. It is planning tool that analyzes communications interoperability between first responders and indicates communications gaps between first responders.

Figure 6:
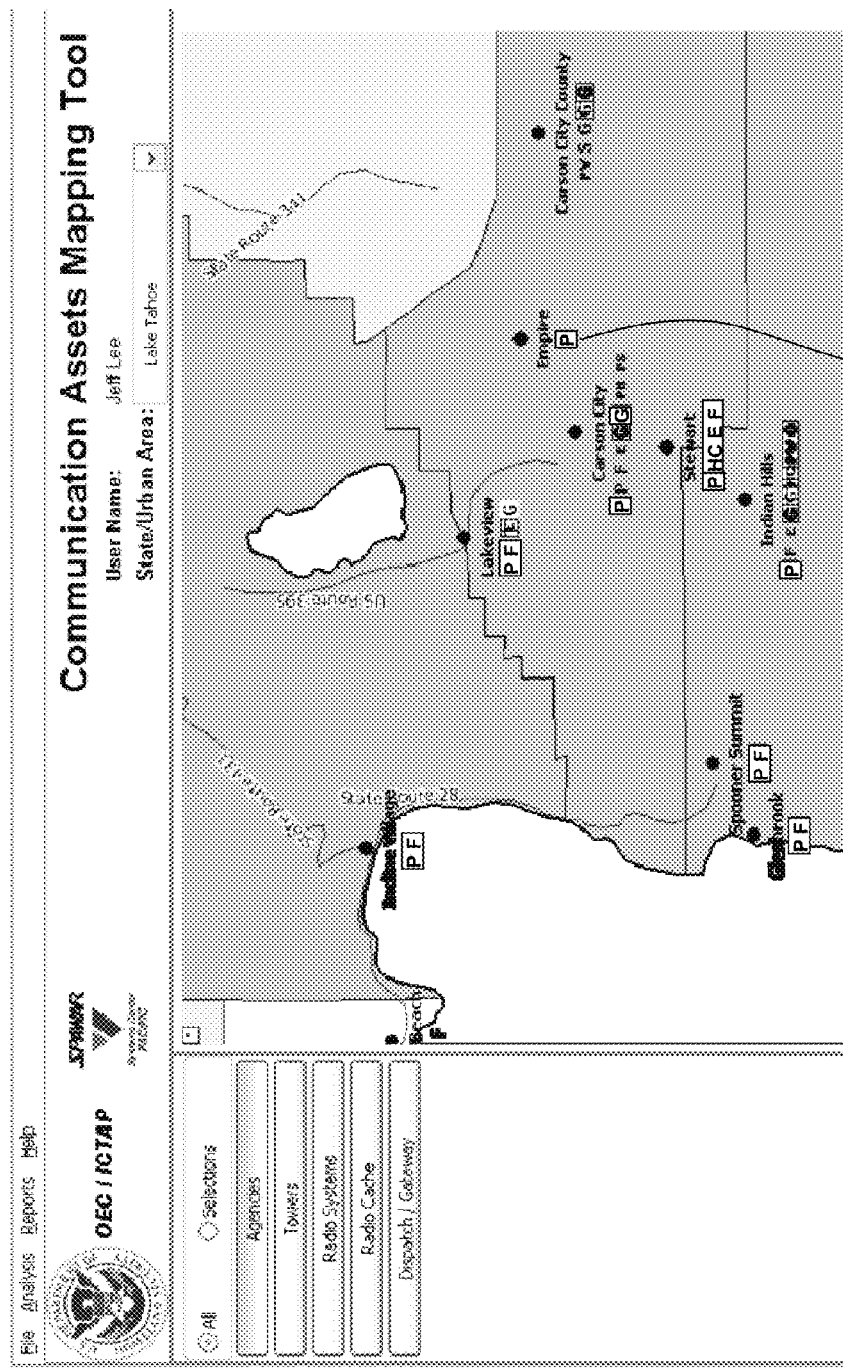

FIG. 6 is a partial screen shot 182 of interoperability information in a map format. From FIG. 6, it can be seen that Carson City has different levels of communications interoperability with different organizations within the geographic area of interest. From FIG. 6, it can also be seen that Empire has no interoperability with any other regional organization, other that swapping radios with Carson City police; however, this may be all that is desired for Empire. As the user "rolls" over the icons depicted as boxes, such as box 180 for the city of Empire, Nev., the specific communications interoperability status for that entity with other first responders can be displayed by the event planner. Additionally, by placing the cursor on box 180 and clicking on icons 184, the first responder radio system and gateway information (if available) can be displayed to the planner user.

The following also describes an exemplary operation of CASM tool system 100 of FIG. 1A. As shown in FIG. 1A, CASM tool module 140 includes CAS data collection sub-module 142 and CAM display sub-module 144. A first user (e.g., San Diego City Police Chief) accesses CAS data collection sub-module 142 via one of at least one computer 110. CASM data collection sub-module 142 and one of at least one computer 110 are operatively coupled via system server 130 and internet 120. In accordance with BOX 210 of FIG. 2, CASM data collection sub-module method 200 collects agency, communication asset and interoperability data from the first user. For example, the user inputs equipment type and frequency usage data through CAS data collection sub-module 142. In accordance with BOX 220 of FIG. 2, CASM data collection sub-module method 200 stores interoperability data in CASM database server 150.

A second user (e.g., San Diego City Fire Chief) accesses CAS data collection sub-module 142 via one of at least one computer 110. The second user can input agency data, communication asset data and interoperability data to CAS data collection sub-module 142 regarding the second user's communication assets. In accordance with BOX 210 of FIG. 2, CAS data collection sub-module method 200 can collect agency, communication asset and interoperability data from the second user. In accordance with BOX 220 of FIG. 2, CASM data collection sub-module method 200 can store agency, communication asset and interoperability data in CASM database server 150.

If given access permission, a third user (e.g., Coast Guard Official) via one of at least one computer 110 accesses CAM display sub-module 146, which interfaces with CASM DB server 150 through CAM data sub-module 144. CAM data sub-module 144 and one of at least one computer 110 are operatively coupled via CAM display sub-module 146, system server 130 and internet 120. In accordance with BOX 310 of FIG. 3, CAM display sub-module method 300 receives a request from the third user for a display of interoperability of the San Diego geographic area. In accordance with BOX 320 of FIG. 3, CAM display sub-module method 300 retrieves San Diego area information regarding agency, communication asset and interoperability data from CASM database server 150 through CAM data sub-module 144. In accordance with BOX 330 of FIG. 3, CAM display sub-module method 300 determines interoperability data and transmits interoperability information in a display format to the third user. Stated differently, the communication gap analysis allows the user to make business decision about whether (or not) "close" a communications gap or to advance along the SAFECOM continuum, before the incident actually occurs. The CASM fulfills a need for strategic planning using the SAFECOM continuum.

It should be appreciated that communications interoperability is an ongoing process, not a one-time investment, and that the minimization of communication gaps and the advances along the Interoperability Continuum must be sustained. Once a governing body for the Interoperability Continuum is set up, it must be prepared to meet on a regular basis, drawing on operational and technical expertise to plan and budget for continual updates to systems, procedures, and training and exercise programs. If regions expect emergency responders to use interoperable equipment on a daily basis, supporting documentation and the installed technology must be well-maintained with a long-term commitment to upgrades and the eventual replacement of equipment.

In addition, collaboration should involve other agencies and organizations that may be critical in supporting the mission of emergency responders. Examples include emergency management agencies, the National Guard, public works, educational institutions/schools, transportation, medical facilities, and large private facilities.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for assessing strategic communications interoperability between first responder agencies within a geographic area, comprising:
    a communication assets database for storing data about communication assets of at least two said first responder agencies, wherein said data includes information about communications assets interoperability;
    a non-transitory computer readable medium containing computer instructions stored therein for causing a computer processor to perform the step of analyzing said information to determine communications gaps between said first responder agencies, said gaps being defined by differences in communication technology levels according to a predetermined SAFECOM continuum, said analyzing step being accomplished before an event occurs; and,
    an interface that displays an interoperability plan which allows planners to view said communication gaps prior to said event occurring, but does not allow said planners to access said interface to modify configurations of communications assets.

2. The system of claim 1, wherein said communication technology levels are selected from the group consisting of swapping radios, gateways, shared channels, proprietary shared systems and standards-based systems.

\* \* \* \* \*